United States Patent [19]

Hopkins et al.

[11] Patent Number: 5,550,437
[45] Date of Patent: Aug. 27, 1996

[54] ELECTRONIC DIMMABLE GAS TUBE POWER SUPPLY WITH OVERVOLTAGE PROTECTION

[75] Inventors: William T. Hopkins; Alan M. Smith, both of Dickson, Tenn.

[73] Assignee: France/Scott Fetzer Company, West Fairview, Tenn.

[21] Appl. No.: 417,955

[22] Filed: Apr. 6, 1995

[51] Int. Cl.[6] .................................................. H05B 37/00
[52] U.S. Cl. ..................... 315/209 R; 315/219; 315/276; 315/DIG. 4
[58] Field of Search ................................. 315/291, DIG. 4, 315/307, 209 R, 276, 277, 278, 279, 224, 219

[56] References Cited

U.S. PATENT DOCUMENTS 4,682,082  7/1987  MacAskill et al. ..................... 315/219
5,349,273  9/1994  Pacholok ................................. 315/307
5,457,360  10/1995 Notohamiprodjo et al. ........... 315/219

Primary Examiner—Robert Pascal
Assistant Examiner—David Vu
Attorney, Agent, or Firm—Wood, Herron & Evans, P.L.L.

[57] ABSTRACT

A ballast for driving a gas discharge tube light with overvoltage protection and dimming. A clamp winding coupled to the internal DC power source prevents overvoltage of the secondary terminals by permitting induced current flow in the clamp winding if the clamp winding voltage exceeds that of the internal DC power source. The transformer core includes a shunt leg which supports a dimmer control winding. When the dimmer control winding is open-circuited, magnetic flux is shunted away from the secondary winding, reducing the light intensity; when the dimmer control winding is short-circuited, currents induce in the dimmer control winding prevent substantial of magnetic flux density and increase the light intensity.

17 Claims, 4 Drawing Sheets

ELECTRONIC DIMMABLE GAS TUBE POWER SUPPLY WITH OVERVOLTAGE PROTECTION

FIELD OF THE INVENTION

The present invention relates to power supplies for lighting.

BACKGROUND OF THE INVENTION

Power supplies, or ballasts, are typically used in powering gas discharge lighting to convert the low-frequency, low impedance, low voltage power source available from a 120 Volt 60 Hz AC wall outlet into a high frequency, high voltage and high impedance source suitable for connection to the gas discharge tube light. Typically a ballast includes a rectifier for rectifying the 120 Volt AC source into an approximately 170 Volt DC source, an oscillator for converting the DC source into a high frequency AC source, and a transformer for stepping up the voltage of this high frequency AC source.

Because the output impedance of a ballast is typically relatively large, the output voltage of the ballast varies widely depending on the load. Many known ballasts suffer from excessive output voltage when operated without load or with a predominantly capacitive load. This may be due to the resonance between the effective transformer output impedance and the output (or stray) capacitance within the transformer or connected to its secondary. Excessive output voltage produces excessive stress on the internal insulation of the transformer, the insulation of the high voltage wiring leading from the ballast, and the insulating materials at the support for holding the gas discharge tube light. The excessive output voltage also violates certain agency safety requirements.

Recently, dimmable light ballasts have been introduced, and are increasingly in demand. A dimmable ballast has a bright mode, for daytime use, and a dim mode for nighttime use. Dimming may be achieved by reducing the current supplied to the light tubing. One known approach to reducing the tubing current is regularly stalling the operation of the oscillator in the ballast, thus providing fewer oscillator cycles to the transformer in dim mode than are provided in the bright mode. However, this approach requires relatively complex control circuitry; furthermore, the frequency at which the oscillator is stalled may be in the audible range, causing audible mechanical vibration of the ballast which may be unacceptably noisy.

SUMMARY OF THE INVENTION

Thus, there is a need for an improved ballast which overcomes the drawbacks noted above, by preventing output overvoltage and providing a simple circuit for reducing the secondary current and dimming the light output.

In accordance with one aspect of the present invention, a ballast, which has primary and secondary windings and an oscillator for driving the primary winding in a bi-directional fashion, also includes a clamp winding of turns which is magnetically coupled to the secondary coil via the transformer core and having terminals connected through a rectifier network to a DC power source clamp or DC voltage limiting device. In an overvoltage condition, the rectifier network permits current to be induced in the clamp winding, generating magnetic flux in the core tending to oppose the magnetic flux produced by the primary winding, and thereby limiting the voltage produced between the secondary terminals.

In specific embodiments, the secondary winding is wound onto the core over the clamp winding, ensuring tight coupling between the two. The DC power source used by the clamp circuit may be the rectified AC power from the wall outlet, which is also used to drive the oscillator.

The ballast may also include disabling circuitry for disabling the oscillator. The disabling circuitry is activated upon detection of current induced in the clamp winding, or detection of ground fault current from the secondary winding. The disabling circuitry latches so that once activated, the disabling circuitry remains active until deactivated, for example by a reset circuit which attempts to deactivate the disabling circuitry at predetermined time intervals.

In accordance with another aspect of the present invention, a ballast includes a core having two windows to provide two closed paths for magnetic field flux through the core. The primary winding and secondary winding are wound onto the core through one of the windows, and a dimmer control winding is wound onto the core through the other window. A variable impedance element is coupled across the terminals of the dimmer control winding to selectably permit or inhibit current flow through the dimmer control winding. When the transformer primary is energized, a magnetic flux is produced in the transformer core which ultimately flows partly through the secondary coil, partly through the clamp winding, with the remaining flux flowing through paths outside the core structure. When current is allowed to flow in the dimmer control winding, the resulting counter magnetic flux produced tends to prevent significant net magnetic flux from passing through the dimmer control winding; this forces most of the primary flux to flow through the secondary winding, thereby increasing the secondary current, and resulting in increased brightness of the light source. However, when current is not permitted to flow in the dimmer control winding, a significant magnetic flux passes from the primary winding through the dimmer control winding without coupling to the secondary winding, thus reducing the brightness of the light.

In specific embodiments, the variable impedance element is a switch which is either closed (and short-circuiting) the dimmer control winding, or open (and open-circuiting) the dimmer control winding. Further, the primary winding is wound onto the core through both windows, whereas the secondary winding and dimmer control winding are wound onto the core through only one of the windows.

The above aspects may also be combined.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
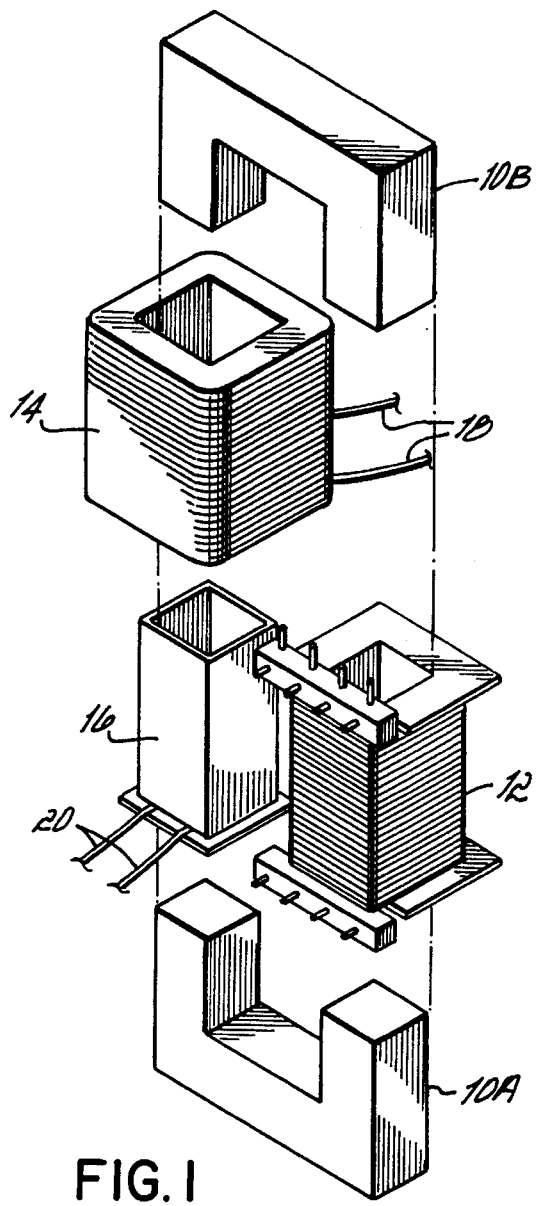
FIG. 1 is an exploded assembly drawing of a transformer including primary, secondary and clamp windings.

Referring to FIG. 1, a transformer assembly in accordance with the principles of the present invention includes a core 10 having a window therethrough, which is assembled from C-shaped core sections 10a and 10b. A primary winding 12 and a secondary winding 14 are formed separately from core 10 and inserted between C-shaped halves 10a and 10b when the transformer is assembled. A clamp winding 16 is also separately formed and sized for insertion between secondary winding 14 and core 10. Clamp winding 16 is inserted in this position when the transformer is assembled.

As discussed in detail below, clamp winding 16 is used to limit the output voltage appearing at the terminals 18 of the secondary winding 14. This is achieved by limiting the voltage which may appear between the terminals 20 of the clamp winding 16.

The voltage which appears at the terminals 18 of secondary winding 14, and the voltage which appears at the terminals 20 of the clamp winding 16, are both directly related to the magnetic flux coupling through these windings in the core 10. As a result, the voltage appearing at terminals 20 of clamp winding 16 is proportional to the voltage appearing at terminals 18 of secondary winding 14.

The clamp circuit described below limits the amplitude of the voltage appearing at terminals 20, by permitting induced current flow in clamp winding 16 whenever the voltage at terminals 20 exceeds a predetermined limit. This induced current flow reduces the magnetic flux coupling through winding 16 and 14, and thereby also limits the voltage appearing at terminals 18 of secondary winding 14.

Figure 2:
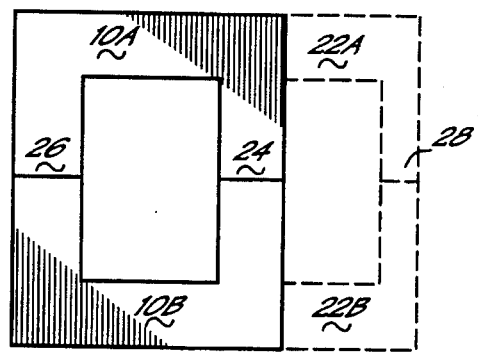
FIG. 2 is a schematic view of a transformer core including a shunt path for a dimmer control winding.

Referring to FIG. 2, in accordance with the principles of the present invention a dimming function may be also be added to the transformer of FIG. 1, by including an additional magnetic shunt path 22a and 22b to the C-shaped transformer core sections 10a and 10b, forming E-shaped transformer core sections. These E-shaped transformer core sections are mated to form a transformer core having two windows therethrough. A central leg 24 supports a primary winding, a secondary leg 26 supports a secondary winding and a shunt leg 28 supports a dimmer control winding.

Figure 3:
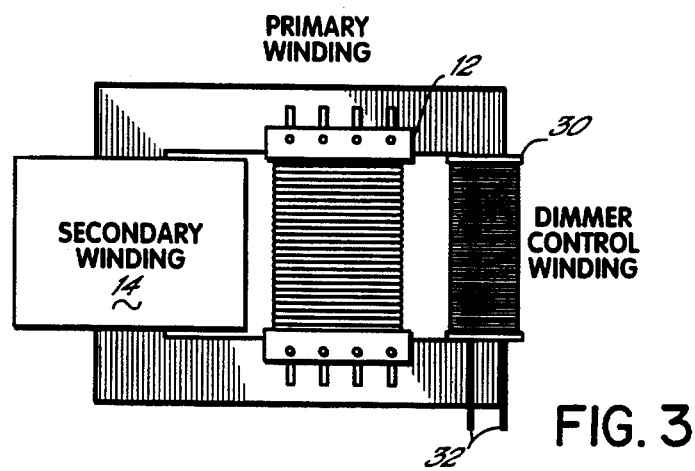
FIG. 3 is a plan view of a modified transformer utilizing the core of FIG. 2, including a primary, secondary and dimmer control winding.

Referring to FIG. 3, the assembled transformer includes a primary winding 12, a secondary winding 14 and, in addition, a dimmer control winding 30 on the shunt leg 28. Dimmer control winding 30 is used to control the current output in the secondary winding 14, through a switch connected between the terminals 32 of the control winding 30. When these terminals are shorted together by a switch, current will be induced in dimmer control winding 30 to prevent significant magnetic flux from passing through shunt leg 28. As a result, when terminals 32 of dimmer control winding 30 are shorted together, most of the magnetic flux, produced by current in primary winding 12, which normally would have flowed through the control winding leg 28 will be directed through secondary leg 26 and coupled to secondary winding 14. In this situation, the current produced by secondary winding 14, and the light intensity produced by a gas discharge tube between the terminals of the secondary winding 14, is increased to a maximum level.

When terminals 32 of dimmer control winding 30 are open-circuited, no induced currents may flow in dimmer control winding 30, and as a result a substantial amount of magnetic flux produced by current in primary winding 12 may pass through shunt leg 28. The flux passing through shunt leg 28 does not couple to secondary winding 14. As a result, in this situation, the current produced by secondary winding 14, and the light intensity produced by a gas discharge tube light between the terminals of secondary winding 14, is reduced to a minimum level.

Thus, control winding 30 acts as a dimmer control; when terminals 32 are shorted together, bright light is produced by a gas discharge tube connected to secondary winding 14, whereas when terminals 32 are not shorted together, dim light is produced by a gas discharge tube connected to secondary winding 14. Any variable impedance, not limited to a switch, may be introduced between terminals 32 to control the light level of the gas discharge tube; for example, a potentiometer producing a variable resistance value can be connected between terminals 32 to provide variable light level control. Also, an electronic switch may be used, which might open and short the control winding rapidly to produce a continuously dimmable function, ranging from full brightness to minimum brightness.

Figure 4:
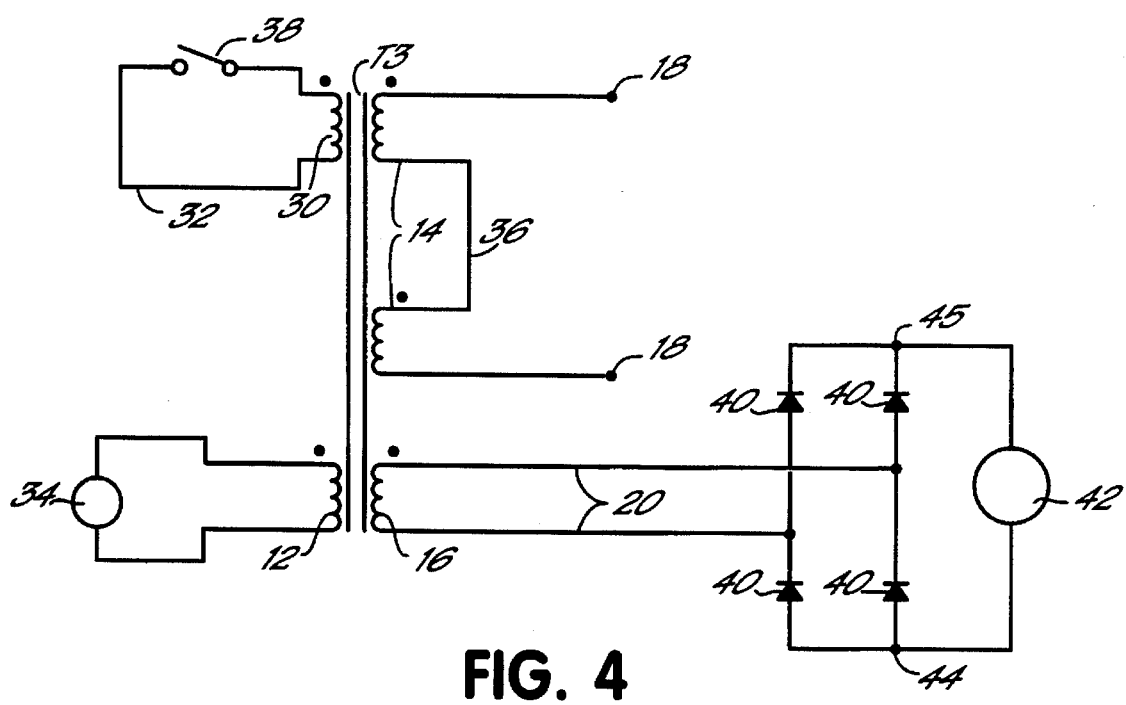
FIG. 4 is a simplified circuit diagram of a ballast including a transformer having a dimmer control winding and a clamp winding.

Referring to FIG. 4, the transformer of FIG. 3 (identified by symbol T3) is used in a ballast circuit by connecting the terminals of the primary winding 12 to a source 34 of high frequency AC power, which couples high frequency alternating flux through the core of the transformer T3 and into the secondary winding 14, clamp winding 16 and dimmer control winding 30. The terminals 18 of the secondary winding 14 are connected directly to the gas discharge tube light, which may be, for example, a neon or mercury tube light. The high frequency AC magnetic flux coupled to the secondary winding 14 by the transformer T3, causes high frequency current to flow in the gas discharge tube, producing light. As shown in FIG. 4, secondary winding 14 may be segregated into two windings with a center tap 36, useful for ground fault protection as discussed below.

As noted above, dimmer control winding 30 is also coupled to the core of the transformer T3 and the terminals 32 of the dimmer control winding are connected directly to a switch 38 for shorting or open circuiting the terminals 32. For the reasons discussed above, when switch 38 is closed, dimmer control winding 30 prevents magnetic field flux from traversing through shunt leg 28 of the transformer (FIG. 2), thereby producing bright light in the gas discharge tube coupled to terminals 18 of secondary winding 14. When switch 38 is opened, no current may flow in dimmer control winding 30, and as a result a significant quantity of magnetic flux travels through shunt path 28 and does not couple to secondary winding 14, thereby reducing the light intensity produced by the gas discharge tube light connected to secondary winding 14.

The terminals 20 of clamp winding 16 are, as noted above, connected to a circuit for limiting the voltage which may appear across clamp winding 16. Specifically, terminals 20 are connected to a full wave bridge rectifier comprised of four diodes 40 coupled between respective terminals 20 of the clamp winding and terminals of a DC power source 42. If at any time, the amplitude of the AC voltage at the terminals 20 of clamp winding 16 exceeds the voltage produced by DC source 42, diodes 40 will turn on and permit current to flow in the clamp winding 16 through terminals 20 and DC source 42. This induced current flow will tend to oppose magnetic field flux travelling through secondary leg 26 of the transformer core (FIG. 2), preventing any additional flux from flowing through clamp winding 16 and secondary winding 14, thus limiting the voltage appearing at terminals 18 of secondary winding 14.

Figure 5:
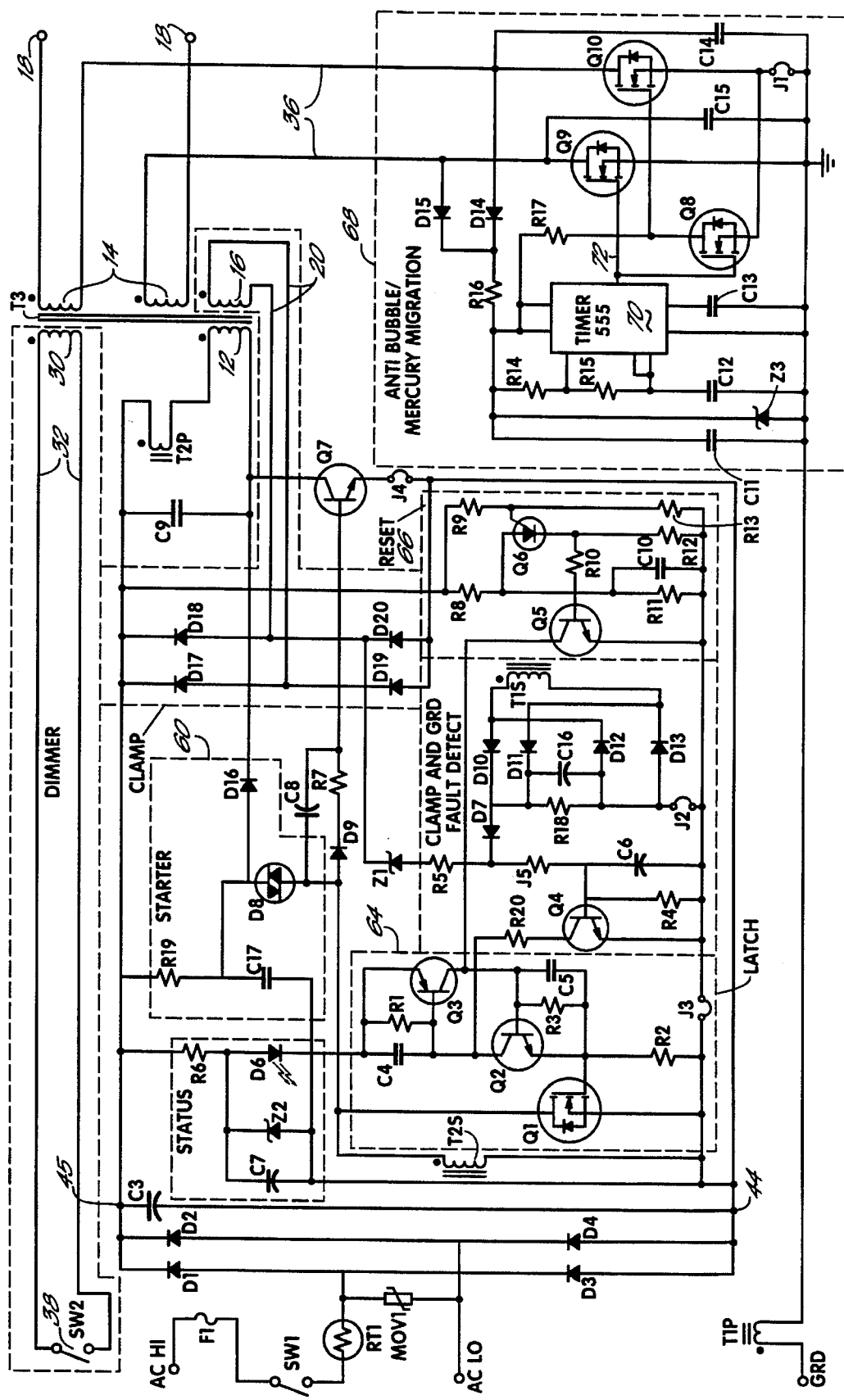
FIG. 5 is a circuit diagram of a ballast including a dimmer control winding and a clamp winding.

Referring to FIG. 5, a specific detailed implementation of a ballast utilizing a transformer such as that shown in FIG. 3 includes various additional circuitry not illustrated in the simplified diagram of FIG. 4.

Specifically, the DC source 42 illustrated in FIG. 4 is produced by a full wave bridge circuit, comprising diodes D1, D2, D3, D4 and capacitor C3. The 120 volt 60 Hz AC line voltage is applied to wall terminals WT1 and WT2 and is coupled to diodes D1–D4 through protection circuitry including a fuse, switch, NTC Resistor and varistor, F1, SW1, RT1 and MOV1, respectively. The full wave bridge, when coupled to the AC power source and filtered by capacitor C1 produces a DC voltage at terminals 44 and 45, of roughly 170 volts, which is used as DC source 42 and also is used in a power supply for an oscillator which forms AC source 34.

Clamp winding 16 is coupled through terminals 20 to a full wave diode bridge comprising diodes D17, D18, D19 and D20 to terminals 44 and 45, thus providing the clamping function discussed above.

Primary winding 12 of transformer T3, in combination with an additional transformer (e.g., utilizing a small toroid core with feedback windings T2P and T2S) and a power transistor Q7, form the basic components of an oscillator which produces power for driving transformer T3, which in turn produces a voltage at terminals 18 of secondary winding 14 for driving the light source.

Figure 6:
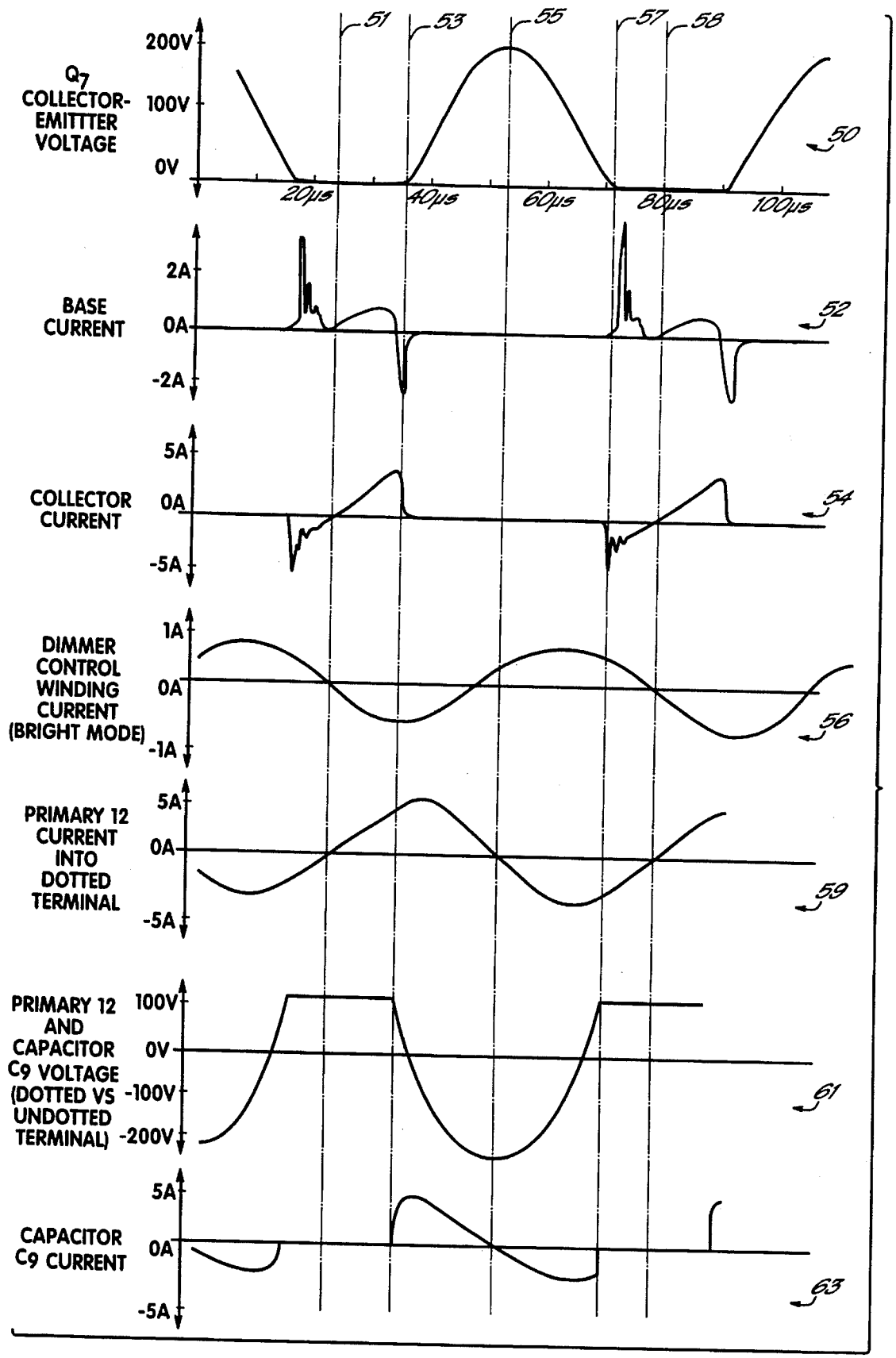
FIG. 6 is a timing diagram of voltage and current waveforms produced by the ballast of FIG. 5.

Now referring to both FIGS. 5 and 6 (and assuming that the oscillator has been operating for several cycles), at the beginning of each cycle of this oscillator (time 51), transistor Q7 begins to turn on, and a portion of the 170 volt DC power between terminals 44 and 45 is applied across primary winding 12. As a result, current begins to flow into the dotted terminal of primary 12 and into the collector of transistor Q7. At the same time, current begins to flow into the dotted terminal of feedback winding T2P. The increasing current flow in winding T2P produces a changing magnetic flux in the core coupled between winding T2P and winding T2S. This changing flux causes winding T2S to produce a positive voltage at its dotted terminal relative to its undotted terminal, which produces current flow out of the dotted terminal of winding T2S. This current flows via diode D9, capacitor C8 and resistor R7 into the base of transistor Q7, quickly forcing transistor Q7 into saturation and maintaining it in the "on" condition for a substantial period of time.

Throughout the next 20 microseconds of the oscillator cycle, transistor Q7 remains "on" and the current in primary winding 12 continues to increase. Ultimately, however, at a point somewhat before time 53 the core of transformer T2S begins to magnetically saturate. This saturation reduces the coupling between the T2P and T2S, reducing the current available to the base of transistor Q7. Eventually, the base current provided to transistor Q7 by feedback winding T2S is insufficient to support the increasing collector current flowing through primary winding 12. When this occurs, transistor Q7 begins turn "off" which reduces the rate of increase of the current flowing through primary 12.

The reduction in the rate of increase of current in primary 12 reduces the rate of increase of magnetic flux coupled to feedback winding T2S, and thereby reduces the voltage and still further reduces the base current produced by winding T2S. This further reduction in base current tends to further decrease the rate of increase in the collector current of transistor Q7 to the point where the collector current can no longer increase, at which time transistor Q7 immediately turns "off" at time 53. (This "turn off" mechanism is explained in more detail in the following paragraphs.) Thus, as soon as transistor Q7 first fails to support increasing current through primary 12, transistor Q7 is nearly immediately turned "off".

When transistor Q7 turns off, a significant current, approximately 5 amperes, is flowing in primary winding 12. Due to the inductance inherent in the structure of transformer T3, primary winding 12 will produce an EMF of sufficient magnitude to maintain continued current flow at this rate. As a result, the 5 ampere current which previously had been flowing into the collector of transistor Q7, now must flow into the terminal of capacitor C9 connected to the undotted terminal of primary winding 12, causing capacitor C9 to discharge from an initial voltage near the level of the DC power supply voltage toward zero voltage.

Once current flow is thus redirected to capacitor C9, the current flow into the dotted terminal of primary winding 12 increases until capacitor C9 has discharged to zero voltage, then begins to decrease, as the energy previously stored in the transformer inductance is transferred to capacitor C9. This decreasing current flow into the dotted terminal of primary winding 12 also produces a decreasing current flow into the dotted terminal of feedback winding T2P. Decreasing current flow in feedback winding T2P produces a change of magnetic flux in the core coupling winding T2P to winding T2S which causes winding T2S to generate a negative voltage at its dotted terminal relative to its undotted terminal. This negative voltage tends to hold transistor Q7 "off".

As primary current continues to flow from primary winding 12 into capacitor C9, the voltage on capacitor C9 increases toward a maximum value, following a roughly sinusoidal wave form. At the same time, the increasing voltage across capacitor C9 appears across primary 12 and tends to reduce the current flow through primary winding 12 along a similar roughly sinusoidal wave form. Ultimately, at time 55, all of the energy contained in the inductance of the transformer structure (which was not delivered to the discharge lamp load) is transferred into capacitor C9, at which point the voltage across capacitor C9, and the collector-emitter voltage of transistor Q7 (trace 50) has reached a peak. This peak voltage is reached roughly 15 microseconds after transistor Q7 turns off.

After capacitor C9 reaches this peak voltage due to current flow from primary winding 12, current ceases and capacitor C9 begins to discharge through transformer primary winding 12, producing a current into the undotted terminal of primary winding 12.

Once the current in primary winding 12 has reversed, throughout the following 15 microseconds, increasing current flows into the undotted terminal of primary winding 12 as capacitor C9 discharges.

The increasing current into the undotted terminal of primary winding 12 also produces increasing current into the undotted terminal of winding T2P, and an increasing magnetic flux in the core coupling winding T2P to winding T2S. This, as before, causes the dotted terminal of winding T2S to maintain a negative voltage relative to the undotted terminal of winding T2S, tending to hold transistor Q7 "off".

continuing at a point somewhat before time 57, capacitor C9 has discharged to zero voltage. Beginning at this time, capacitor 9 begins to charge again, but in the opposite polarity than previously. Finally, at time 57, the voltage across capacitor C9 reaches a level slightly higher than the DC power supply voltage, such that the collector-emitter voltage of transistor Q7 has returned to roughly zero volts. At this point, most of the energy previously transferred to capacitor C9 (minus that energy consumed by the discharge lamp load) has been returned to the inductance of the transformer structure, and a substantial current of near 5 amperes is flowing into the undotted terminal of primary winding 12.

Due to the inductance in the structure of transformer T3, primary winding 12 produces an EMF of sufficient magnitude to maintain this 5 ampere current. Initially, this EMF causes a charge to collect on capacitor C9, so that capacitor C9 accumulates a voltage roughly equal to the power supply voltage, but in the opposite polarity than as described earlier.

At essentially the same time, the current into the undotted terminal of primary winding 12, which reached its peak value of approximately time 57, begins to flow into the terminal of capacitor C9 connected the dotted terminal of primary winding 12. However, the voltage across capacitor C9 eventually reaches a level slightly higher than the DC power supply voltage. This forward-biases the collector-base junction of transistor Q7, allowing current to flow out of the dotted terminal of primary 12, into capacitor C3, into the undotted terminal of transformer secondary T2S, through capacitor C8 and the diode D9/resistor R7 network, into the base of transistor Q7, out its collector, and into the undotted terminal of primary winding 12. This current continues to flow in this path (steadily decreasing) until insufficient energy remains stored in transformer T3 to maintain the voltage required across capacitor C9 to keep the collector-base junction of transistor Q7 forward-biased (equal to the DC power supply voltage plus the forward voltage drop of the collector-base junction of transistor Q7). This corresponds to time 58. At this time, capacitor C9 begins to discharge into the dotted terminal of primary 12 and primary T2P, resulting in a current into the base of transistor Q7 which turns Q7 "on". The cycle then repeats itself following the steps described above.

Thus, as illustrated in FIG. 6, the oscillator circuit of FIG. 5 causes a regular oscillation of various current and voltage wave forms. As seen in trace 50, the collector emitter voltage to transistor Q7 has a roughly "0" value during time periods when transistor Q7 is inverted, or is turned on, and has a roughly sinusoidal characteristic during those periods when transistor Q7 is turned off.

As seen in trace 52, the current flowing from winding T2S into the base of transistor Q7 has a steadily increasing value during those time periods when transistor Q7 is turned on, increasing to a maximum value of approximately 500 milliamperes just before transistor Q7 turns off.

As seen in trace 54, at time 57, transistor Q7 begins conducting current (in the inverted mode) which decays to zero at time 58, at which time transistor Q7 turns "on" in a forward (or normal) direction, and current increases linearly until transistor Q7 turns "off". Traces 59, 61 and 63 show the corresponding variations in the current of primary 12, the voltage of primary 12 and capacitor C9, and the current in capacitor C9, respectively.

As discussed above, the circuit of FIG. 5 includes a dimmer control winding 30 coupled to transformer T3. The terminals 32 of dimmer control winding 30 are coupled to a switch 38 which is used to dim the light output from a lamp connected to the secondary winding at terminals 18. When switch 38 is closed, a significant current is induced in dimmer control winding 30 in response to magnetic field flux attempting to flow through shunt leg 28 of the transformer. It is this induced current which sharply limits the amount of magnetic flux that may flow through shunt leg 28, and thereby forces additional magnetic flux to flow through secondary leg 26 and couple to secondary winding 14. As seen in trace 56 in FIG. 6, the current flowing through control winding 30 when switch 38 is closed has a roughly sinusoidal wave form, and an amplitude of approximately 700 milliamperes.

The circuit of FIG. 5 also includes additional features intended to control the operation of the oscillator described above. Specifically, a starter circuit 60 is included to insure that the oscillator starts oscillating when power is first applied to the circuit. Starter circuit comprises resistor R19 and capacitor C17, diac D8 and diode D16. When power is applied to the ballast, creating DC voltage between terminals 44 and 45, current flows through resistor R19 and begins charging capacitor C17. If capacitor C17 continues to charge in this way, ultimately diac DS will break over and a sharp pulse of current will flow out of capacitor C8 through diac D8 and into the base of transistor Q7, turning transistor Q7 on. Once transistor Q7 is turned on, the oscillating action described above will be initiated.

So long as the oscillator continues operating, transistor Q7 will be regularly turned on, causing capacitor C17 to regularly discharge through diode D16 and transistor Q7, and inhibiting any further pulsing from diac DS. However, if the oscillator discontinues operation for any reason, capacitor C17 will not be inhibited from charging and as described above, and diac D8 will ultimately break over and produce a restarting current pulse into the base of transistor Q7. Starting circuit 60 will continuously produce these restarting current pulses until the oscillator is restarted or power is removed from the ballast.

The ballast circuit of FIG. 5 also includes a clamp and ground fault detection circuit 62 which interacts with a latch circuit 64 to disable the oscillator whenever the clamp winding 16 has clamped the output of the ballast, or whenever a significant ground fault current has been detected. Clamp detection is preformed by a zener diode Z1 attached to one of the terminals 20 of the clamp winding 16. If the output voltage of clamp winding 16 is sufficiently high, reverse current will flow through zener diode Z1 and through resistors R5, J5 and R4. This current flow will tend to turn transistor Q4 on, producing a current flow through resistor R20, resistor R1, and the base of transistor Q3 of the latch circuit 64.

Current flow through the base of transistor Q3 of the latch circuit 64 will cause transistor Q3 to turn on, producing significant current out of the collector terminal of transistor Q3. This collector current will flow through resistor R3 and the base of transistor Q2, tending to turn transistor Q2 on as well. When transistor Q2 is turned on, it will produce collector current through resistor R1 and the base of transistor Q3, tending to maintain transistor Q3 on. Thus, regenerative feedback retains transistors Q2 and Q3 on once they have been turned on by transistor Q4.

When transistor Q2 is turned on, emitter current flows through resistor R2, increasing the voltage at the gate terminal of transistor Q1. When the gate voltage of transistor Q1 is elevated in this manner, transistor Q1 turns on and effectively shorts winding T2S. When winding T2S is shorted, no transistor Q7 base current can thereafter be generated by winding T2S to turn transistor Q7 on, and as a result transistor Q7 will no longer turn on and the oscillator described above will cease operating.

Latch circuit 64, once activated in this manner, will remain in this state, with transistors Q2 and Q3 both turned on, holding transistor Q7 on and disabling the oscillator, until the latch circuit is reset. When the power supply is in this "latched off" status LED D6 is illuminated due to current flow through transistors Q2 and Q3, thereby indicating that the power supply has detected a fault and shut down.

Latch circuit 64 may also be activated by detection of a ground fault. A ground fault may indicate a short to ground at the secondary winding or between a high voltage lead leading to the gas discharge lamp and ground. These conditions can be dangerous and it is necessary therefore to turn off the oscillator and immediately remove the secondary output voltage upon detection of ground fault current.

Ground fault current is detected by measuring any significant current from center tap terminals 36 of the secondary winding to the ground terminal WT3 which may be connected to the ground prong in a conventional wall outlet. When ground fault current is flowing from terminals 36 (through the anti-bubble mercury migration circuitry 68, which is discussed below), this ground fault current must flow through winding T1P. An auxiliary transformer core (e.g., a small toroid core) couples winding T1P to winding T1S, which is located in the clamp and ground fault detection circuit 62.

As a result, ground fault current causes winding T1S to generate an AC voltage having an amplitude proportional to the ground fault current. The voltage generated by the winding T1S is rectified by a full wave rectifier comprising diodes D10, D11, D12 and D13 and impressed across resistor R18 and capacitor C16. If this voltage reaches a significant level, diode D7 will turn on and current will flow through jumper J5, the base of transistor Q4 and resistor R4 which, as noted above, turns transistor Q4 on and will cause the latch circuit 64 to turn transistor Q1 on disabling the oscillator.

Thus, if any significant ground fault current is detected by winding T1P, the oscillator will be disabled by the interaction of the clamp and ground fault detection circuit 62 and the latch circuit 64.

The circuit of FIG. 5 also includes an automatic reset circuit 66. Reset circuit 66 produces regular reset pulses which attempt to reset latch circuit 64. Reset circuit includes a programmable unijunction transistor (PUT) Q6 which interacts with resistors and capacitors to produce reset pulses. In essence, the DC voltage between terminals 44 and 45 causes capacitor C10 to charge through resistor R8. As capacitor C10 charges, eventually it reaches a voltage sufficient to turn PUT Q6 on. At this point, PUT Q6 discharges capacitor C10 through resistor R12. During this discharging time, a sufficient voltage is developed across resistor R12 to cause transistor Q5 to turn After capacitor C10 has discharged through resistor R12, an insufficient current flows through PUT Q6 to retain PUT Q6 on. At this time, PUT Q6 turns off, ceasing current flow through resistor R12 and turning transistor Q5 off. Capacitor C10 then begins to recharge through resistor R8, restarting the cycle.

This cycle described above causes transistor Q5 to regularly turn on for a brief period of time at regular intervals determined by the values of capacitor C10, and resistors R11 and R8. The resulting "on" pulse of transistor Q5 serves a reset for latch circuit 64.

When transistor Q5 turns on, it draws a significant collector current. This collector current is drawn from the collector of transistor Q3, diverting the current which (as noted above) otherwise would flow through resistor R3 and into the base of transistor Q2. As a result, when transistor Q5 is turned on, transistor Q2 momentarily turns off. If, at the time transistor Q2 is turned off, transistor Q4 is not turned on and drawing collector current through resistor R20, no significant current will be drawn through resistor R1. As a result, if transistor Q4 is not turned on at the same time that transistor Q5 is turned on, transistor Q3 will turn off. Once transistor Q3 has turned off, the voltage of the gate of transistor Q1 will essentially return to the voltage of terminal 44 and transistor Q1 will turn off. Once this has happened, winding T2S will no longer be shorted and the oscillator will restart upon the next pulse from starter circuit 60.

If, however, transistor Q4 is turned on (due to ground fault current or a significant clamp voltage from terminals 20 of clamp winding 16), when transistor Q2 turns off, significant current will continue flowing through resistor R1, and transistor Q3 will remain on. Then, when transistor Q5 is turned off by reset circuit 66, the collector current from resistor Q3 will flow through R3 and turn transistor Q2 back on, such that the oscillator will continue to be disabled.

As noted above, the center tap terminals 36 of secondary winding 14 are connected to an antibubble mercury migration circuit 68. This circuit has the purpose of eliminating bubbles or striations visible in the gas discharge tube light and also preventing the migration of mercury in mercury gas discharge tube lights.

As discussed in commonly assigned U.S. Pat. No. 4,682,082, "bubbles" are formed when a gas discharge light is driven by a high frequency AC power source. Essentially, these bubbles or striations are non-illuminated nodes which appear in the light. This above-noted patent indicates that bubbles can be prevented by providing DC current flow through the gas discharge tube, which masks bubbles formed in the light.

In a mercury gas discharge tube lamp, a DC current flow can, over a long period of time, cause mercury to accumulate at the ends of the lamp or at sharp bends in the tube, causing undesirable discoloration. This phenomenon is known as mercury migration.

Circuit 68 overcomes both of these problems by creating a current waveform in the gas discharge tube lamp which, although having no long term DC component, has a low frequency DC component to the current waveform. This low frequency component has the effect of masking bubbles in the light from the lamp.

Anti-bubble mercury migration circuit 68 forms this current waveform by alternately connecting, at a low frequency rate, one of capacitors C15 and C14 into the current path for the gas discharge lamp. Oscillator 70 (which may be commercially available 555 Timer) produces at its output 72 a digital signal of low frequency. This digital signal is applied directly to the gate of transistor Q9 and is also applied via transistor Q8 to the gate of transistor Q10. Transistor Q8 forms a digital inverter such that when the signal on line 72 is a "1" or high voltage, transistor Q8 is turned on bringing the gate of transistor Q10 to a "0" or low voltage. Alternatively, when the voltage at line 72 is a "0" voltage, transistor Q8 is turned off and pull up resistor R17 raises the voltage of the gate of transistor Q10 to "1" voltage, turning transistor Q10 on. Thus, transistors Q9 and Q10 are turned on and off in response to the signal on line 72 in a complementary fashion such that Q9 is off whenever Q10 is on, and vice versa.

As a result, for half of each low frequency cycle of timer circuit 70, transistor Q9 is turned off and transistor Q10 is turned on, such that current flow in the gas discharge lamp passes through capacitor C15, and transistor Q10 producing an additional voltage drop across capacitor C15 and in series with the discharge lamp. During the opposite half cycle of timer circuit 70, transistor Q10 is turned off and transistor Q9 is turned on, such that current flow in the gas discharge lamp passes through capacitor C14, and transistor Q9, producing an additional voltage drop across capacitor C14 and in series with the discharge lamp. As a result, an asymmetrical current is produced in the secondary winding 14 and gas discharge lamp which alternatively is shifted from one direction to another and back at the frequency of timer 70, which masks bubbles or striations in the gas discharge lamp without producing a long term DC current which might cause mercury migration.

Power is supplied to 555 timer 70 through a half wave rectification and regulation circuit consisting of diodes D14 and D15, zener diode Z3 and capacitor C11. Diodes D14 and D15 half-wave rectify the voltage appearing across capacitor C15 or C16, producing current flow into filter capacitor C11. Zener diode Z3 maintains the voltage of capacitor C11 at the desired power supply voltage required for 555 timer 70. Resistor R16 limits current flow from diodes D14 and D15, through resistor R16, and thus the quiescent current of zener diodes Z3. The frequency of 555 timer 70 is determined by programming resistors R14, R15 and capacitor C12.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A ballast for supplying power to a light, comprising
   a core of magnetically permeable material defining a window therethrough for providing a closed path for magnetic field flux around said window,
   a primary winding comprising a primary conductor extending between two primary terminals and wound onto said core through said window such that magnetic field flux produced by current in said primary conductor is channeled into said closed path;
   an oscillator coupled between said primary terminals and bi-directionally electrically stimulating said primary winding via said primary terminals to produce bi-directional magnetic flux in said core;
   a secondary winding comprising a secondary conductor extending between two secondary terminals and wound onto said core through said window such that magnetic field flux travelling along said closed path couples to said secondary winding and electrically stimulates said light coupled between said secondary terminals;
   a clamp winding comprising a conductor extending between two clamp terminals and wound onto said core through said window such that magnetic field flux travelling along said closed path couples to said clamp winding and produces a voltage between said clamp terminals, said clamp winding being wound onto said core directly adjacent to said secondary winding to produce a low leakage flux coupling between said secondary winding and said clamp winding; and
   a clamping circuit having two clamping terminals, said clamping circuit absorbing energy through said clamping terminals whenever a voltage in excess of a given clamp voltage is applied between said clamping terminals;
   said clamp terminals of said clamp winding being connected to said clamping terminals of said clamping circuit;
   whereby said clamping circuit absorbs energy from said clamp winding by permitting a current to be induced in said clamp winding whenever a voltage in excess of said clamp voltage is produced between said clamp terminals, such that said clamp winding produces magnetic flux in said closed path tending to oppose magnetic flux produced by said primary winding and thereby limits voltage produced between said secondary terminals.

2. The ballast of claim 1 wherein said clamping circuit comprises:
   a DC power source having two DC power source terminals and producing said clamp voltage between said DC power source terminals; and
   a rectifier coupled between said DC power source terminals and said clamping terminals, said rectifier prohibiting current flow between said clamping terminals and said DC power source terminals unless the voltage between said clamping terminals is in excess of said clamp voltage.

3. The ballast of claim 2 wherein said rectifier is a full-wave rectifier.

4. The ballast of claim 2 wherein said DC power source comprises
   a rectifier coupled between an AC power source and said DC power source terminals for rectifying said AC power source, and
   a storage capacitor coupled between said DC power source terminals.

5. The ballast of claim 2 wherein said oscillator comprises
   a switch having two terminals coupled between one of said primary terminals and one of said DC power source terminals, and a control terminal, said switch providing current flow between said one primary terminal and said one DC power source terminal in response to an electrical signal received at said control terminal;
   circuitry alternately providing said electrical signal to said control terminal of said switch and removing said electrical signal from said control terminal of said switch.

6. The ballast of claim 5, wherein said switch is a semiconductor device.

7. The ballast of claim 6 wherein said circuitry alternately providing said electrical signal to said control terminal and removing said electrical signal from said control terminal comprises a feedback core of magnetically permeable material defining a feedback core window therethrough;

a feedback primary winding comprising a conductor coupled between one of said primary terminals and one of said DC power source terminals in series with said semiconductor device, and wound onto said feedback core through said feedback core window;

a feedback secondary winding comprising a conductor coupled at one end to said control terminal and wound onto said feedback core through said feedback window, such that said feedback secondary winding provides an electrical signal to said control terminal in response to changing current flow through said feedback primary winding.

8. The ballast of claim 1 wherein said secondary winding is wound onto said core over said clamp winding.

9. The ballast of claim 1 further comprising disabling circuitry for disabling said oscillator, clamp detection circuitry for detecting whether a voltage in excess of said clamp voltage is produced between said clamp terminals, and if so activating said disabling circuitry to disable said oscillator.

10. The ballast of claim 9 further comprising reset circuitry for deactivating said disabling circuitry at predetermined time intervals.

11. The ballast of claim 9 wherein said secondary winding further comprises a center tap terminal electrically connected to said secondary conductor between said secondary terminals, and further comprising a ground terminal for connection to an electrical ground, and ground fault detection circuitry connected between said center tap terminal and said ground terminal for detecting whether substantial current is flowing between said center tap terminal and said ground terminal, and if so activating said disabling circuitry to disable said oscillator.

12. The ballast of claim 1 wherein said core further defines a second window therethrough for providing a second closed path for magnetic field flux around said window, and further comprising a dimmer control winding comprising a dimmer conductor extending between two dimmer terminals and wound onto said core through said second window such that magnetic field flux travelling along said second closed path couples to dimmer control winding; and a variable impedance element coupled between said dimmer terminals for selectably permitting or inhibiting current flow through said dimmer conductor, whereby said variable impedance element selectably permits current to be induced in said dimmer control winding, such that said dimmer control winding produces magnetic flux in said second closed path tending to oppose magnetic flux produced by said primary winding, thereby increasing magnetic flux coupled to said secondary winding and increasing light intensity produced by said light.

13. The ballast of claim 12 wherein said variable impedance element is a switch having an open position in which current flow in said dimmer conductor is inhibited and a closed position in which current flow in said dimmer conductor is permitted.

14. The ballast of claim 12 wherein said primary winding is wound onto said core through both said windows, said secondary winding and said dimmer control winding are wound onto said core through only one of said windows, and said secondary winding and said dimmer control winding are wound onto said core through different ones of said windows.

15. A ballast for supplying power to a light, comprising a core of magnetically permeable material defining first and second windows therethrough for providing first and second closed paths for magnetic field flux around said windows, a primary winding comprising a primary conductor extending between two primary terminals and wound onto said core through at least one of said windows such that magnetic field flux produced by current in said primary conductor is channeled into said closed paths;

an oscillator coupled between said primary terminals and bi-directionally electrically stimulating said primary winding via said primary terminals to produce bi-directional magnetic flux in said core;

a secondary winding comprising a secondary conductor extending between two secondary terminals and wound onto said core through said first window such that magnetic field flux travelling along said first closed path couples to said secondary winding and electrically stimulates said light coupled between said secondary terminals;

a dimmer control winding comprising a dimmer conductor extending between two dimmer terminals and wound onto said core through said second window such that magnetic field flux travelling along said second closed path couples to said dimmer control winding; and a variable impedance element coupled between said dimmer terminals for selectably permitting or inhibiting current flow through said dimmer conductor, whereby said variable impedance element selectably permits current to be induced in said dimmer control winding, such that said dimmer control winding produces magnetic flux in said second closed path tending to oppose magnetic flux produced by said primary winding, thereby increasing magnetic flux coupled to said secondary winding and increasing light intensity produced by said light.

16. The ballast of claim 15 wherein said variable impedance element is a switch having an open position in which current flow in said dimmer conductor is inhibited and a closed position in which current flow in said dimmer conductor is permitted.

17. The ballast of claim 15 wherein said primary winding is wound onto said core through both said windows, and said secondary winding and said dimmer control winding are wound onto said core through only one of said windows.

\* \* \* \* \*

UNITED STATES PATENT AND TRADEMARK OFFICE
CERTIFICATE OF CORRECTION

PATENT NO. : 5,550,437
DATED : August 27, 1996
INVENTOR(S) : Hopkins et al.

It is certified that error appears in the above-identified patent and that said Letters Patent is hereby corrected as shown below:

Column 7, line 67 and Column 8, Line 1, after the word "primary" and before the numeral "12", please insert the word --winding--.

Column 7, line 8, delete the words "capacitor 9" and replace them with --capacitor C9--.

Column 7, line 28, delete the words "C9 connected the" and replace them with --C9 is connected to the--.

Column 8, line 28 and line 37, delete the words "diac DS" and replace them with --diac D8--.

Column 9, line 63, after the words "to turn", insert the word --on.--.

Column 10, line 1, delete the letters "RS" and replace them with --R8--.

Column 12, line 46, after the word "a" and before the word "rectifier", insert the word --second--.

In the abstract, line 11, delete the word "induce" and replace it with --induced--.

In the abstract, line 12, delete the words "substantial of" and replace them with --substantial shunting--.

Column 7, line 6, delete the word "continuing" and replace it with --Continuing--.

Signed and Sealed this

Twenty-fifth Day of March, 1997

*Attest:*

BRUCE LEHMAN

*Attesting Officer*   Commissioner of Patents and Trademarks